March 15, 1938.   P. M. HENKES   2,111,471
MACHINE TOOL OF THE SENSITIVE TABLE TYPE
Filed April 15, 1936   2 Sheets-Sheet 1

Inventor
Peter M. Henkes
By Peck & Peck
Attorneys

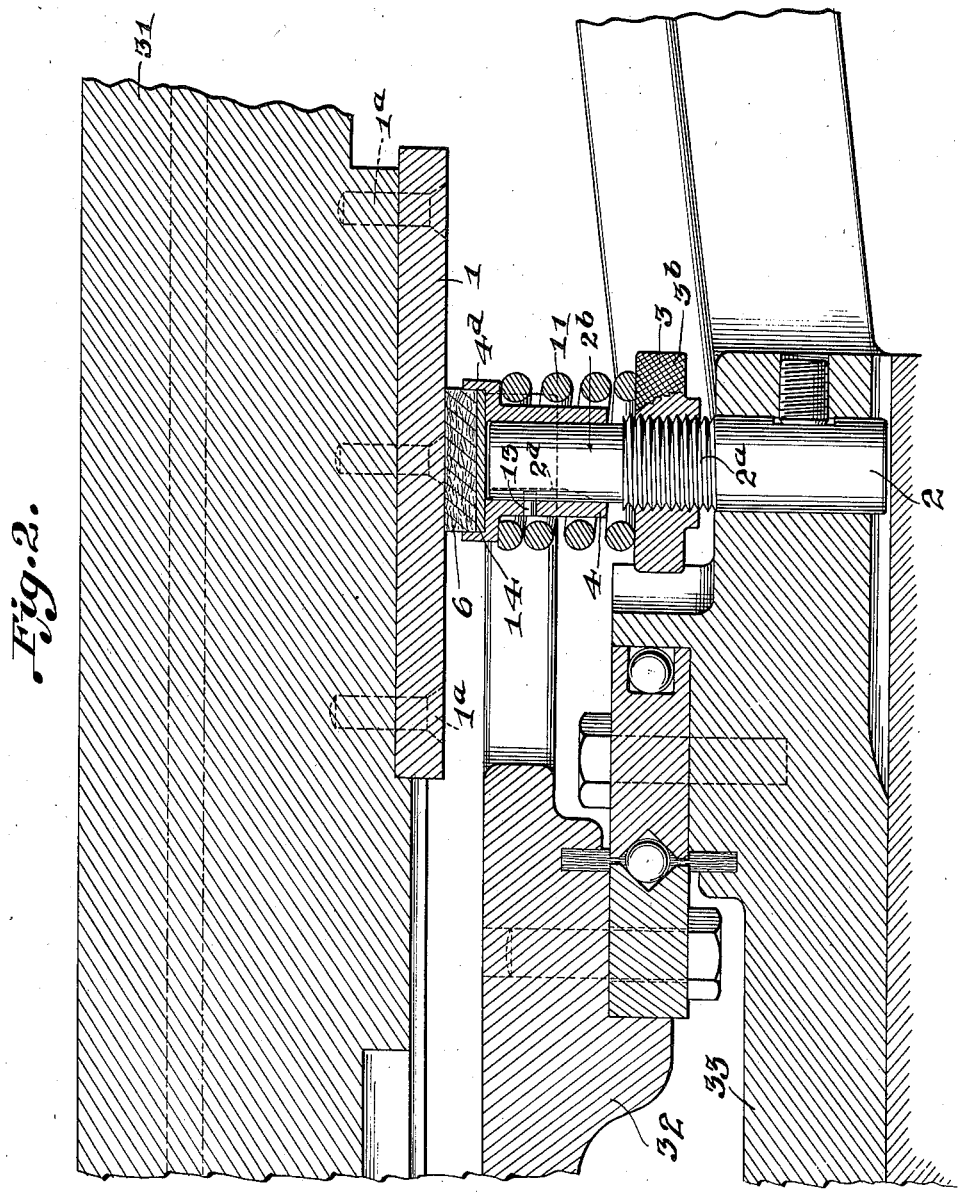

Patented Mar. 15, 1938

2,111,471

UNITED STATES PATENT OFFICE 2,111,471

MACHINE TOOL OF THE SENSITIVE TABLE TYPE

Peter M. Henkes, Racine, Wis., assignor to George Gorton Machine Company, Racine, Wis., a corporation of New Jersey Application April 15, 1936, Serial No. 74,576

10 Claims. (Cl. 90—58)

This invention relates to certain improvements in machine tools of the sensitive table type; and the objects and nature of the invention will be apparent in light of the following explanations of the accompanying drawings that illustrate what I now believe to be the preferred embodiment of my invention from among other forms, constructions and arrangements within the spirit and scope thereof.

In the operation of milling machines and other machine tools employing universally laterally movable members, for instance, sensitive tables that are universally laterally movable in a normally fixed plane under the control and impelling action of hand operated leverage means, I have discovered the desirability of providing manually controlled and applicable retarding means whereby the sensitiveness of such tables can be easily controlled for steadying such tables against sudden shocks under varying work conditions, particularly whereby the tables can be more easily controlled, for instance against heavy cutting operations where otherwise the extreme sensitiveness of the table movements might make it harder to control by manually actuated leverage or the like.

It is an object of this invention to provide such sensitive table machines, for instance, such as exemplified by the disclosure of United States Patent 2,005,696, issued June 18, 1935, to George Gorton Machine Company, of Racine, Wisconsin, as assignee, with manually controlled retarding means whereby the sensitiveness of such tables can be varied, without serving as a positive table lock but with the end in view of obtaining varying degrees of resistance against the sensitive table movement under the actuating power of preferably a manually controlled leverage.

A further object of the invention is to provide sensitive table machines of the milling machine or machine tool type or the like with easily applied and released and adjustable pressure mechanism for controlling the table lateral movements with the end in view of varying the sensitiveness of such table, and with the further end in view of providing a simple, economical and easily adjusted and set control for thus varying the sensitiveness of the universally laterally movable table and which can be easily manipulated from operative table retarding position, and as easily manipulated to apply varying degrees of retarding pressure to the table.

With the foregoing and other objects in view, that will become apparent from the following description, my invention consists in certain novel features of construction and arrangement and in combinations of parts and features, as more fully hereinafter described, and specified in the appended claims.

Referring to the accompanying drawings, forming a part hereof.

Fig. 1, more or less diagrammatically, illustrates those features of the sensitive table machine tool of the hereinbefore identified patent, that are more directly referred to in the following description, parts being broken away.

Fig. 2 is a sectional view, on a larger scale, of portions of the base, saddle, and sensitive table with the table retarding mechanism shown in operative relation between the base and table.

Figure 1:
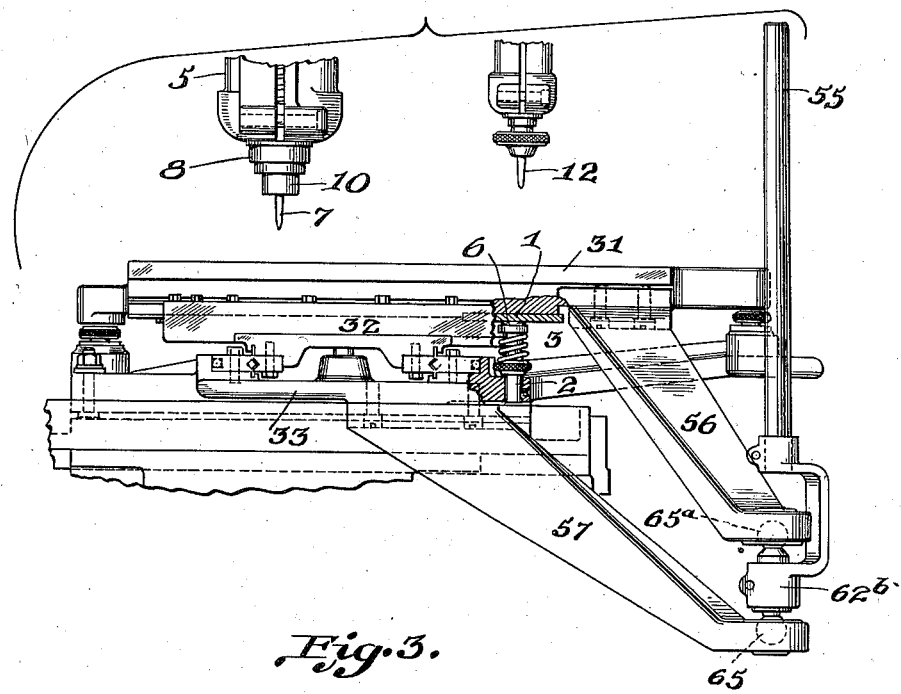
Figure 3:
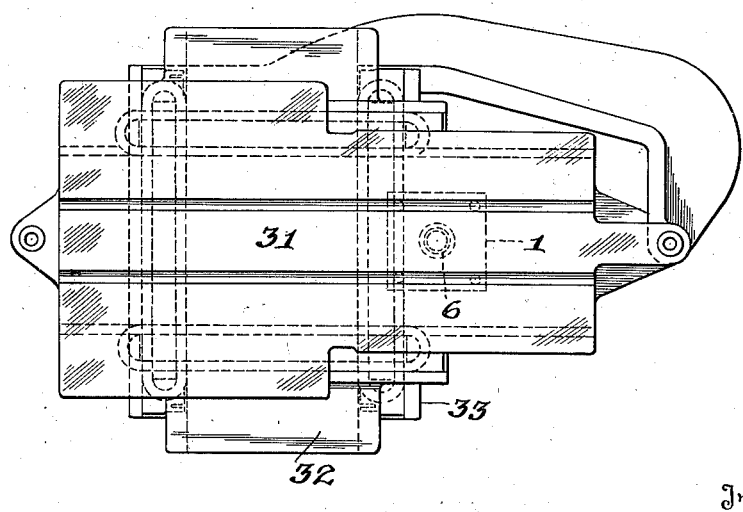
Fig. 3 is a detailed top plan view of the sensitive table, dotted lines indicating the bottom area thereof that travels during table universal lateral movements, in contact with the retarding device.

In the particular example illustrated, the machine is equipped with a cutter head 5 provided with a slide barrel or quill 8 that carries the rotary cutter spindle 10, for supporting and driving the engraving or milling cutter 7 for operation on work carried by the sensitive table, hereinafter more fully described.

The cutter head 5 is usually rigidly supported from an overhanging portion of the machine frame or column, not herein shown.

The type of machine illustrated, also provides a stylus 12 for tracing the pattern that is to be reproduced or duplicated by the cutter 7. This stylus 12 is carried by a stylus head supported from the frame portion, that carries the cutter head 5, all in such manner that the stylus 12, and the cutter 7, are maintained with their longitudinal axes parallel and in normally fixed laterally spaced relation.

While I do not in all respects desire to so limit my present invention, yet in order to give an example of the preferred application thereof, I refer for details to the hereinbefore identified patent, for full disclosure and explanation of parts not herein specifically illustrated.

In the type of sensitive table machine illustrated by said patent, a sensitive table 31 is provided, and on this table is fixed the pattern under the stylus 12 in such manner as to permit the stylus to follow the lateral and depth dimensions of the pattern. On this table is also fixed the work, under the cutter 7, so that the cutter 7 will correspondingly produce in the work, the lateral and depth dimensions of the pattern.

For this purpose in the particular type of machine shown by the patent, the stylus 12 and the cutter 7 are vertically movable as a unit under the control of suitable manually actuated feed means, while said stylus and cutter are held against relative lateral movement. The lateral tracing and cutting of the stylus and cutter with respect to the pattern and work, are controlled by the universal lateral movements of the table 31 while maintained in a normal fixed plane, under the impelling and holding control of a manually actuated leverage that embodies the universally laterally movable lever or handle 55. In the example of a sensitive table machine illustrated, the universally laterally movable sensitive table 31 is supported from the machine knee or other frame part, through the medium of a normally stationarily fixed base 33, and a saddle 32.

The saddle 32 is mounted on the base against objectionable relative vertical movement, to straight line fore and aft travel or reciprocation.

The table 31 is mounted on the saddle, against objectionable relative vertical movement, to straight line reciprocation or travel in either direction longitudinally, that is, in a path at right angles to the path of straight line travel of the saddle on the base.

Any suitable slideways can be provided between the saddle and base and the saddle and table 31 to render the table 31 freely and universally movable laterally in a normally fixed horizontal plane, although in the patent and in the drawings I happen to shown raceways and series of balls for thus rendering the saddle and the table 31 freely movable laterally and for confining the saddle to the base and the table 31 to the saddle against relative vertical movements. In this connection my present invention is not concerned with the particular means for maintaining the saddle to the base and the table 31 to the saddle in the hereinbefore described laterally movable relations.

In the type of sensitive table machine, illustrated merely as an example of an embodiment of my invention, the base is provided with a fixed laterally projecting arm 57, and the table 31 is provided with a stiff complementary laterally projecting arm 56 rigidly secured thereto, in this instance at the right hand end thereof, and a long handle or lever 55 is arranged in a position accessible to the operator at the front of the machine, and this lever is so coupled to the fixed supporting arm 57, and to the table push and pull arm 56, as to be freely universally swingable laterally at its upper or handle end and to thereby actuate the table 31 on its universal lateral movements. In this specific example the lever 55 provides at its lower end a short power arm 62b fulcrumed at its lower end 65 to the fixed arm 57 and at its upper end 65a having universal lateral push and pull pivotal connection with the push and pull arm 56 of the sensitive table 31.

As an example of one embodiment from among others, to accomplish the hereinbefore stated object of this invention, I provide the saddle 32 with an upwardly projecting table retarding device capable of bearing upwardly against a preferably smooth-surfaced plane horizontal area rigid with the under side of the sensitive table 31, and this device embodies means whereby the retarding pressure thereof against or with respect to the table 31 can be varied or whereby said device can be rendered inoperative with respect to the table 31 to thereby free the table from retarding action or pressure in so far as said device is concerned.

In the specific example illustrated, without so intending to limit my invention, I show a flat preferably hardened metal plate 1, fixed, preferably in a suitable seat, to the under side of the table 31 so that the bottom face of this plate 1 is in a horizontal plane parallel to the horizontal plane in which the table 31 is universally movable laterally. This plate 1 can be fixedly secured to the table 31 by machine screws 1a, having smooth-surfaced heads countersunk on the under side of the plate or in any other suitable manner. Or as a matter of fact, a horizontal bottom surface of the table itself can provide the preferably smooth-surfaced horizontal area that coacts with said device to retard the movements of the table 31. The horizontal contacting surface area of the plate 1, that cooperates with said retarding device, is preferably at least equal to the area of the extreme ranges of universal lateral movements of the table.

As a specific example of an embodiment of the retarding device that cooperates with the surface 1 of the universally laterally movable table 31, I show a stud 2 normally rigidly fixed to the base 33 below the plate 1 of table 31, and projecting upwardly toward said plate from the base 33. On a longitudinally exteriorly threaded portion 2a of this stud 2, I provide a rotary adjusting nut 3, the internal thread of which meshes with the thread of the fixed stud 2, so that the nut 3 by rotation on the stud 2 will move up or down on the stud. On the upper end of the stud I provide a longitudinally movable tubular body or cap 4, freely slidable longitudinally of the cylindrical portion 2b of the stud above nut 3, while held against rotary or axial movement on the stud by internal radial pin 13, fitting in longitudinal slot or keyway 2d cut in the stud.

The upper end of this longitudinally movable tubular body 4 above the stud 2 forms an open top cup or holder 4d for a block 6 of frictional material such as employed for automobile brake linings. This shoe forming frictional material blocks 6 is fitted tightly in the cup 4d, preferably on a suitable metal washer or base 14, and projects upwardly from the cup to bear with retarding pressure against the bottom surface of the plate 1 on the table 31. The top face of the frictional block 6 is preferably parallel with the bottom face of the plate 1 on the table 31.

This holder 4, 6, longitudinally slidable on the stud 2, is preferably urged upwardly under and by the expansive spring pressure of coil spring 11, seated on the top of the adjusting nut 3 and against the under surface of the cup 4d. This spring surrounds the tubular body 4 that depends from the enlarged diameter cup 4d.

The arrangement is such that by rotation of the adjusting nut 3 in one direction the upward pressure of the spring on the friction block holder 4 can be decreased, to the point where the friction block 6 drops from contact with the plate 1 of the sensitive table 31.

By rotation of the nut 3 in the opposite direction, the upward tension of the spring 11, on the brake block holder 4 can be increased to force the brake block 6 upwardly with yielding pressure against the plate 1 of table 31, and this pressure can be increased or decreased to the extent desired by the particular operation then in hand.

The adjusting or control nut 3, is preferably located between one end of the base 33 and one end portion of the table 31, in this example, so as to render the same readily accessible to the hand and fingers of the operator located at the front of the machine for easy rotation of the nut in the desired direction to apply or release the friction block 6 to or from operative relation with respect to the table 31.

The nut 3 is usually comparatively large in diameter with a knurled or roughened finger surface 3b or is otherwise so formed for easy grasping and operation by the hand or fingers of the operator.

While universally laterally movable sensitive table retarding means, located as hereinbefore described, has proved highly satisfactory in practical commercial use, yet I do not wish to so limit my invention, as it is obvious that the retarding means can be arranged on a support fixed with respect to the lateral movements of the sensitive table, other than the particular base herein shown, or that positions of parts may be reversed.

It will be noted that the retarding means disclosed is not designed or intended to exert such upward pressure on the sensitive table as to constitute a table lock, and it will also be noted that the table is confined to its normal lateral movements in a fixed horizontal plane, that is, that the retarding means is not designed to cause relative vertical movement between the table and its saddle, or base.

In some instances, the lateral-movement sensitiveness of the table 31, is increased by the very light weight thereof due to its fabrication from very light exceedingly strong metal alloy, as well as by the table mounting whether or not the table and its mounting provide series of supporting travelling balls, or other thoroughly lubricated accurate slideways that do not include the series of travelling or other balls. In any event, whatever the table mounting, by preference, the table mounting rendering the table sensitive and freely universally laterally movable, also accurately maintains the table against relative vertical movement, and to the lateral movements in a normally fixed plane.

Desiring to protect my invention both broadly and as to species, to the fullest extent legally possible, what I claim is:—

1. In a machine tool, in combination, a sensitive table mounted for lateral movements, said table having a plane surface area parallel with the plane in which said table is laterally movable, a relatively fixed support provided with an upstanding normally fixed stud, a rotary nut screw-threaded on said stud for vertical adjustment by rotation thereon, a plunger vertically movable on said stud and having a friction block to exert upward slidable-friction pressure against said plane surface, and an expansion spring adapted to exert upward pressure against said plunger and controlled by said nut.

2. In a machine tool, a table provided with mountings rendering the table universally laterally movable and sensitive to laterally impelling forces; and a control operatively coupled thereto for impelling said table throughout its range of universal lateral movements, in combination with manually-adjustable means for subjecting said table to table-movement-resisting force throughout the full range of table universal lateral movements, substantially perpendicular to the plane of table lateral movements, to thereby resist said table movements and control the sensitiveness of said table to forces tending to laterally impel the same.

3. In a machine tool, a support; a table provided with mountings rendering said table universally laterally movable with respect to said support in a normally fixed plane and sensitively responsive to laterally-impelling forces; and a manually-actuated direct control for impelling and controlling said table throughout its range of universal lateral movements, in combination with mechanism for controlling the responsive sensitiveness of said table, throughout its range of universal lateral movements, to forces tending to propel the table laterally, said mechanism including first means positively movable laterally with said table throughout the full range of table lateral movements, and complementary cooperative second means carried by said support against normal lateral movements with said first means, one of said two means including a surface parallel with said table and substantially coextensive in area with the range of universal lateral movements of said table, the other of said two means including a member for contacting said surface throughout the full range of said table movements, said mechanism providing a spring device for yieldingly forcing said surface and member together in a direction substantially perpendicular to the plane of said surface, throughout said range of table movements, to thereby yieldingly oppose said table movements.

4. In a machine tool, a support; a table provided with mountings rendering said table universally laterally movable with respect to said support and sensitively responsive to laterally-impelling forces; and a manually-actuated direct control for impelling and controlling said table throughout its range of universal lateral movements, in combination with a single mechanism for controlling the responsive sensitiveness of said table, throughout its range of universal lateral movements, to forces tending to propel the table laterally, said mechanism including a plate rigid with said table and having a surface substantially coextensive in area with said table range of universal lateral movements and parallel with the plane of said table movements, and a member movably carried by said support and provided with means for yieldingly forcing said member into table-movement-opposing contact with said plate throughout said range of table movements to thereby set up a yielding force opposing lateral movements of said table, said mechanism providing a selective adjustment for controlling said table-movement-opposing contact and thereby varying the responsive sensitiveness of said table, and for relieving said table from said force opposing the table movements.

5. In a machine tool, a support; a universally laterally movable table and its mountings rendering said table freely laterally movable, said table provided with a positive hand control for impelling the same on its lateral movements, said table as a fixed part thereof provided with a flat surface parallel with the plane of table lateral movements and in area substantially coextensive with the range of table lateral movements, in combination with means carried by said support for applying force against said surface in opposition to table lateral movements to thereby control and vary the responsive sensitiveness of said table to forces tending to impel the table laterally, said means including normally-fixed guiding means, a plunger movable thereon toward and from said surface and providing an end holder for friction means to slidable contact said surface as said surface relatively travels laterally in all directions, spring means for yieldingly forcing said plunger toward said surface, and manually actuated setting and adjusting means for controlling the pressure of said spring on said plunger.

6. In a machine tool, a freely laterally movable table and its mountings, provided with manual control and impelling means, said table as a normally fixed part thereof providing a horizontally disposed bottom flat surface of substantial area; a support normally fixed with respect to said table; a normally fixed guide carried by said support and upstanding toward said surface, a plunger movable on said guide toward and from said surface and provided with a head for abutting said surface to yieldingly resist lateral travel of said surface against said head, spring means to yieldingly force said plunger head against said surface, and a manually adjustable nut threaded on said guide to vary and control and to relieve the tension of said spring on said plunger.

7. In a machine tool, a table provided with mountings rendering the table freely movable laterally in any direction, said mountings including a saddle carrying said table with the table relatively movable laterally, and a base carrying said saddle with the saddle relatively movable laterally, said table also provided with a positive control for impelling the table on its various lateral movements, in combination with a mechanism for controlling the responsive sensitiveness of the table to forces tending to impel the same laterally, said mechanism including means arranged under and normally fixed to the table and laterally and vertically movable therewith, and second means above and carried by said base against relative lateral movements and complementary to for cooperation with said first means, one of said means including a flat substantially rigid surface parallel with the normal plane of said table lateral movements and in area substantially coextensive with the table range of lateral movements, and the other said means including a table-movement-retarding plunger normally exerting pressure against said surface with a travelling contact throughout the range of universal lateral movements of said table; pressure means controlling the table-movement retarding action of said plunger on said surface; and adjusting and setting means for said pressure means.

8. In a machine tool, in combination; a driven rotary cutter for laterally operating on and around work through relative lateral movements between the work and cutter; a stylus for tracing a pattern by relative lateral movements between the stylus and pattern; mechanism for controlling the relative lateral movements between the cutter and work by the relative lateral movements between the stylus and pattern, including a universally laterally movable member provided with mountings confining said member to lateral movements in all directions in a normally fixed plane and rendering said member sensitively responsive to forces tending to laterally propel the same in any direction; means for impelling said member laterally in any direction to maintain the stylus and pattern, and the cutter and work, respectively, operatively together laterally against the lateral throw of the rotating cutter when operating on the work; and movement retarding mechanism acting on said member substantially perpendicularly to its plane of universal lateral movements and throughout its range of universal lateral movements for controlling the responsive sensitiveness of said member to forces tending to impel the same laterally, said movement retarding mechanism provided with adjusting and setting means for controlling its movement retarding action on said member.

9. In a machine tool, in combination; a rotary cutter adapted to operate on and around work under relative universal lateral movements between the cutter and work; mechanism for producing such universal lateral relative movements between the cutter and work, including a member provided with sensitive mountings rendering said member universally laterally movable in a normally fixed plane and sensitively responsive to laterally impelling forces; a support relatively fixed with respect to said member; a handle having direct operative connection with said member for impelling and controlling the universal lateral movements of said member; and retarding mechanism between said support and said member and operatively associated with said member to control the sensitiveness thereof to forces tending to propel the member laterally in any direction, throughout the full range of universal lateral movements of the member, said retarding mechanism having a single adjustment means for varying the retarding influence of the mechanism on the member.

10. In a machine tool, a member provided with sensitive mountings rendering said member universally laterally movable in a normally fixed plane and sensitively responsive to laterally impelling forces; and a control for impelling and controlling said member throughout its range of universal lateral movements, in combination with a support relatively stationary with respect to said member; and pressure mechanism operatively associated with said support and said member for acting on said member in a direction perpendicular to said plane throughout the full range of universal lateral movements of said member for controlling the responsive sensitiveness of said member to forces tending to propel the same laterally in any direction.

PETER M. HENKES.